Figure 5:
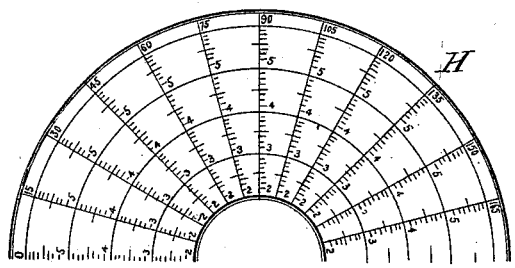
Figure 7:
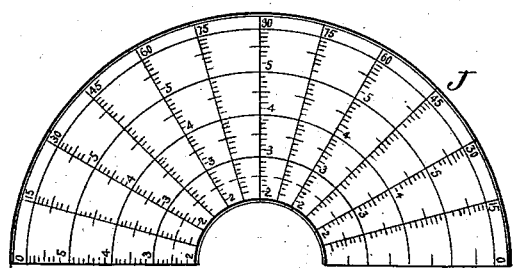

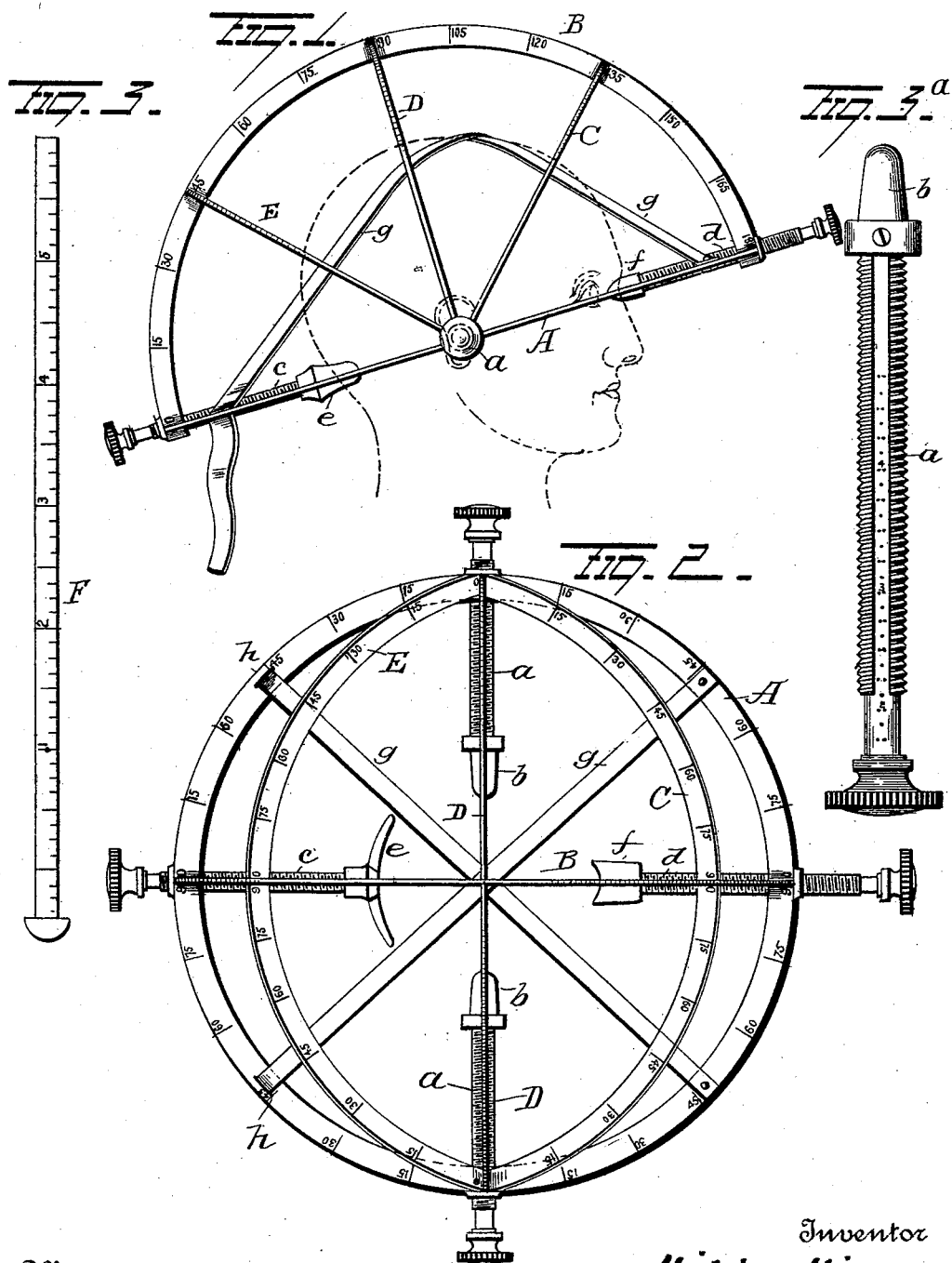

(No Model.) 2 Sheets—Sheet 2.

W. WINDSOR.
PHRENOMETER.

No. 537,094. Patented Apr. 9, 1895.

Witnesses
G. F. Downing.
S. W. Foster.

Inventor
William Windsor
By H. A. Seymour
Attorney

THE NORRIS PETERS CO., PHOTO-LITHO., WASHINGTON, D. C.

UNITED STATES PATENT OFFICE.

WILLIAM WINDSOR, OF WASHINGTON, DISTRICT OF COLUMBIA.

PHRENOMETER.

SPECIFICATION forming part of Letters Patent No. 537,094, dated April 9, 1895.

Application filed October 12, 1893. Serial No. 487,935. (No model.)

*To all whom it may concern:*

Be it known that I, WILLIAM WINDSOR, of Washington, in the District of Columbia, have invented certain new and useful Improvements in Phrenological Devices; and I do hereby declare the following to be a full, clear, and exact description of the invention, such as will enable others skilled in the art to which it appertains to make and use the same.

My invention relates to an improvement in phrenological devices,—the object of the invention being to provide means whereby to determine the conformation of a skull, in order to ascertain the measurements of the brain at various points.

A further object is to provide means whereby to accurately determine the distance from the skull at the various parts thereof to a point in the center of the medulla oblongata.

A further object is to produce simple and efficient means whereby the measurements of the skull relatively to the medulla oblongata can be made and accurately transcribed.

With these objects in view the invention consists in a system for ascertaining phrenological measurements, consisting in first measuring the brain at various points on the skull, and then transcribing such measurements on charts conforming to the various lines of measurement on the skull.

The invention also consists in certain novel features of construction and combinations and arrangements of parts, as hereinafter set forth, and pointed out in the claims.

In the accompanying drawings: Figure 1 is a view illustrating my improved device applied to a head. Fig. 2 is a plan view of the device. Figs. 3 and 3ª are detail views. Figs. 4, 5, 6, 7 and 8 are views of charts for recording the various measurements of the skull.

A represents an annular base, adapted (in a manner hereinafter described) to be disposed at an angle of fifteen degrees or thereabout to the perpendicular of the head to which it is applied,—or in other words, said annular base is to be so applied to the head of the subject that it will be disposed parallel with the base of the brain. The annular base A is divided into four quadrants of ninety degrees each, and at the diametrically opposite zero marks on said annular base, adjusting screws $a, a$, are located. To the inner ends of the screws $a$, blocks $b$, preferably of hard rubber, are swiveled, said blocks being adapted to enter the ears, the axis of the annular base thus being made to pass through the head in line with the ears. At diametrically opposite points on the annular plate A, adjusting screws $c, d$, are respectively located. To the inner end of the screw $c$, a rest $e$ is swiveled and adapted to bear against the neck in proximity to the base of the skull. The inner end of the screw $d$ is provided with a swiveled rest $f$ adapted to bear against the nose immediately between the eyes. By thus adjusting the annular base A to the neck and nose, and arranging the transverse axis thereof in line with the ears, said annular base will be accurately disposed parallel with the base of the brain of the subject. A semi-annular plate B is secured at its ends to the annular base A at the junction of the adjusting screws $c, d$, therewith, said semi-annular plate B thus being made to extend centrally over the head from front to rear. The semi-annular plate B is divided into one hundred and eighty degrees and at three equidistant points, or in other words, at marks 45°, 90° and 135°, on said semi-annular plate B, semi-annular plates C, D, E, intersect, said plates C, D, E, being preferably secured to the plate B. The ends of the semi-annular plates C, D, E, meet at the zero points on the annular base A and have a common diameter, which is coincident with the transverse diameter of the semi-annular base, passing through the head in line with the ears.

From the construction and arrangement of parts as above described, it will be seen that the plates C, D, E, are disposed at right angles to the plate B and that the latter divides each plate (C, D, E,) into two quadrants. Each of these quadrants is divided into ninety degrees, counting from the zero marks on the circular base, to the plate B.

To adjust the device to the head in the manner above explained without providing some other support would probably result in discomfiture, and to avoid this, I provide straps $g, g$, of leather or other soft material, which are fastened at one end to the base plate A, pass over the head and at their other ends are passed through slots *h* in the base plate A at points diametrically opposite the points of attachment thereto,—the straps being retained in a fixed position, when adjusted, by frictional contact with the walls of the slots *h*.

In ascertaining the various phrenological measurements desired, an indicator F is employed, and consists of a straight bar graduated inversely in inches and one-eighth inches. This indicator is placed on the annular base A or one of the semi-annular plates (according to the part of the head to be measured) and the end permitted to touch the skull. The measurement indicated on the indicator at the edge of the part of the instrument to which it is applied, will give the distance from the common center of the annular base and all the semicircles, to the skull,—thus, in effect, giving the measurement of the brain at a particular point from the medulla oblongata to the skull, which is the basis of all phrenological calculation.

Figure 4:
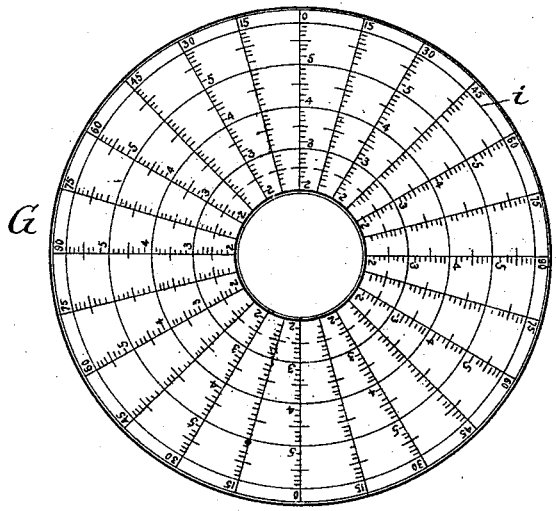
Figure 6:
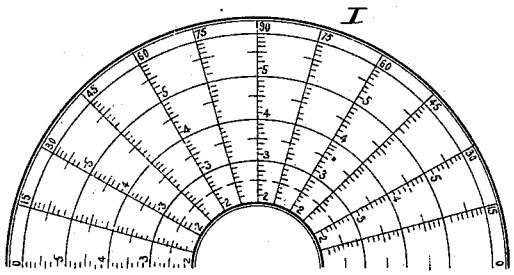
Figure 8:
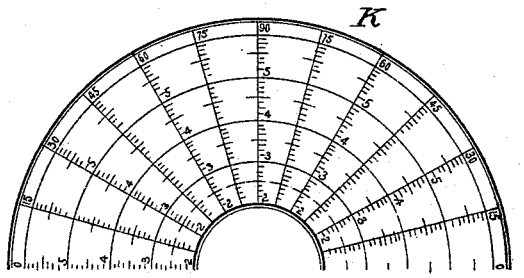

It will be seen that measurements made on the line of the annular base A, by the use of the indicator F, will give the various measurements desired at the base of the skull parallel with the base of the brain. As each of such measurements is made, the same will be recorded by a suitable mark on a circular phrenological chart G as indicated in Fig. 4. The line *i* of this chart marks the periphery of the chart, which is coincident with the annular base, and said chart should be graduated in conformity with the graduations of said annular base, so that when a measurement is made at any particular degree on said annular base, the same may be properly recorded on the proper line or degree on the chart. The lines or degrees on the chart will be preferably made at least four inches in length and will be graduated in inches and one-eighth inches, the same as the indicator F, so that when a measurement is made with the indicator, the same can be quickly and accurately recorded without the necessity of any calculation whatever and without having to place the indicator on the chart.

Semi-annular charts H, I, J, K, shown in Figs. 5, 6, 7 and 8 are graduated in the same manner as chart G and are graduated correspondingly with the semi-annular plates which they represent. The measurements are indicated on these charts in the same manner as above explained in connection with chart G.

As the attachment of the adjusting screws to the circular base, will prevent the use of the indicator at such points on the same, said adjusting screws are graduated in the same manner as the indicator, so that accurate measurements can be made at the parts of the skull where the adjusting screws make contact.

Having fully described my invention, what I claim as new, and desire to secure by Letters Patent, is—

1. The combination with an annular graduated base, of devices for supporting said base parallel with the base of the brain of the subject, substantially as set forth.

2. The combination with an annular graduated base, and means for supporting the same on the head of a subject, of a semi-annular graduated plate secured at its ends to the annular base and adapted to extend over the head of the subject from front to rear, substantially as set forth.

3. The combination with an annular graduated base and means for supporting the same on the head of a subject, of a series of semi-annular plates secured at their ends to said annular base, said semi-annular plates having a common diameter coincident with the transverse diameter of the annular base, substantially as set forth.

4. The combination with an annular base, divided into four quadrants, each quadrant subdivided into ninety degrees, and the two zero marks being at diametrically opposite points on the annular base, of a semi-annular plate secured to the annular base and disposed centrally between the zero marks on the annular base and arranged at right angles to the transverse axis thereof, substantially as set forth.

5. The combination with an annular base divided into four quadrants, each quadrant subdivided into ninety degrees, of a semi-annular plate arranged centrally between the zero marks on said annular base and adapted to extend over the head from front to rear, said semi-annular plate subdivided into one hundred and eighty degrees, and a series of equi-distant semi-annular plates secured to the annular base and having a common diameter coincident with the transverse axis of the annular base, each of said series of semi-annular plates being divided into two quadrants and each quadrant subdivided into ninety degrees, substantially as set forth.

6. The combination with an annular base, of a longitudinal semi-annular plate secured at its ends thereto, a series of equidistant latitudinal semi-annular plates secured to the annular base and having a common diameter coincident with the transverse diameter of the annular base and said semi-annular plates being concentric with a common center, and an indicator graduated inversely and adapted to measure the distance from said common center to the skull of the subject on the lines of said annular base and semi-annular plates, substantially as set forth.

7. The combination with an annular graduated base, of adjusting screws at diametrically opposite points on said annular base, blocks carried by said adjusting screws and adapted to enter the ears of the subject, diametrically opposite adjusting screws connected with said annular base at right angles to the first-mentioned adjusting screws and carrying nose and neck rests respectively, substantially as set forth.

8. The combination with an annular graduated base, of graduated adjusting screws adapted to adjust the same to the head of a subject parallel with the base of the brain, substantially as set forth.

9. The combination with an annular base and a series of semi-annular plates secured thereto, of means for adjusting the device on the head of the subject parallel with the base of the brain and straps secured at one end to said annular base and adjustably connected at diametrically opposite points thereto, substantially as set forth.

In testimony whereof I have signed this specification in the presence of two subscribing witnesses.

WILLIAM WINDSOR.

Witnesses:
R. S. FERGUSON,
C. S. DRURY.